(No Model.)
J. R. STANDLEY.
FENCE.
No. 339,116. Patented Mar. 30, 1886.
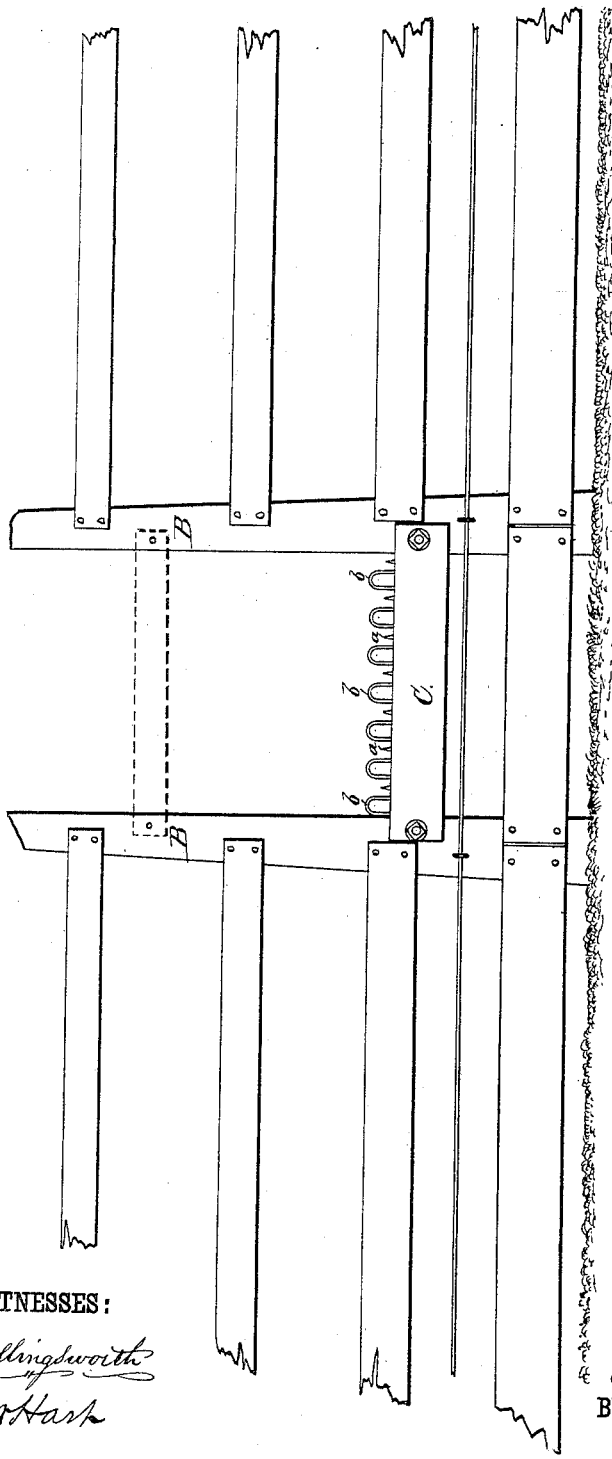
WITNESSES:
W. W. Hollingsworth
Amos N Hart
INVENTOR:
J. R. Standley
BY Munn & Co.
ATTORNEYS.

UNITED STATES PATENT OFFICE.

JOSEPH R. STANDLEY, OF PLATTEVILLE, IOWA.

FENCE.

SPECIFICATION forming part of Letters Patent No. 339,116, dated March 30, 1886.

Application filed September 2, 1885. Serial No. 176,128. (No model.)

*To all whom it may concern:*

Be it known that I, JOSEPH R. STANDLEY, a citizen of the United States, residing at Platteville, in the county of Taylor and State of Iowa, have invented a new and useful Improvement in Fences, of which the following is a description.

On farms where cattle and swine are kept together it is frequently desirable or necessary to confine the latter to a certain yard or field without, however, imposing like restraint on the former. To do this has heretofore required the use of gates, and much daily care and labor on the part of the farmer or his help.

It is the object of my invention to provide a simple form of fence which will allow cattle to pass freely over it, but prevent the passage of swine, thus operating automatically, so to speak, and dispensing with all attention on the part of the farmer.

In carrying out my invention I form what may be termed a "cattle-gateway and swine bar or fence," by means of a bar, which is arranged horizontally a short distance above the ground, and having spikes and staples set in its upper side, as hereinafter more fully described, and also shown in accompanying drawing, which represents a front view of a fence or swine-bar constructed according to my invention.

In an ordinary stock or cattle fence, A, inclosing a yard or field, I provide a passage-way between two posts, B B. Across this passage-way extends the swine-barrier formed of the narrow bar C, set with spikes and staples, as before stated. It is placed about twenty inches from the ground, and secured to the posts by bolts or other suitable means. The spikes $a$ and staples $b$ extend in a row along its upper side, and alternate in position, as shown—that is to say, each spike being between two staples. The function of the spikes is to prick the feet of swine, and the staples to prevent contact of the feet or legs of cattle with the spikes. I prefer to make the latter of such length that when driven in their sharp-pointed ends project about three-eighths of an inch above the bar. The staples $b$ are, however, about two and one-half inches high and set two inches apart.

A bullock or horse will pass over such a bar without difficulty or injury, but it effectually prevents swine from doing so, for the reason that in attempting it a swine will invariably rise on his hind legs and place his fore feet on the bar, and thus necessarily on a spike, $a$, or staple $b$. If on the latter, the feet slip off and come down on the spikes, so that in either case his feet are pricked more or less severely, which causes the animal to quickly desist from his attempt. It is obvious that various substitutes may be employed for the staples.

By this simple and inexpensive device I form a perfect fence against swine, but which offers no obstruction to passage of other stock out of or into a yard or field, and is therefore a very useful adjunct of fences for certain stock-farms.

The swine bar or fence may be employed with great advantage around springs and water or feed troughs for horses and cattle, from which it is desired to exclude swine; and the horses and cattle may be prevented from stepping over the swine-bar by means of a pole placed about twenty-six inches above it, and parallel to it, as shown by dotted lines, thus leaving a space through which the horses, &c., can insert their heads and necks, for the purpose of feeding or drinking.

What I claim is—

1. A swine barrier or fence, consisting of a horizontal bar having a row of alternating spikes and staples set in its upper side, as shown and described.

2. The combination, with a cattle-fence, A, having a passage-way, as specified, of a swine-barrier consisting of a bar spanning said passage-way about twenty inches above the ground, and having a row of alternating spikes and staples set in its upper side, as and for the purpose specified.

JOSEPH R. STANDLEY.

Witnesses:
 I. F. HARRIS,
 JOSHUA FREEMYER.